Oct. 11, 1949. M. R. ELSER 2,484,158
RECIPROCATING TOOL ATTACHMENT
Filed Feb. 21, 1947
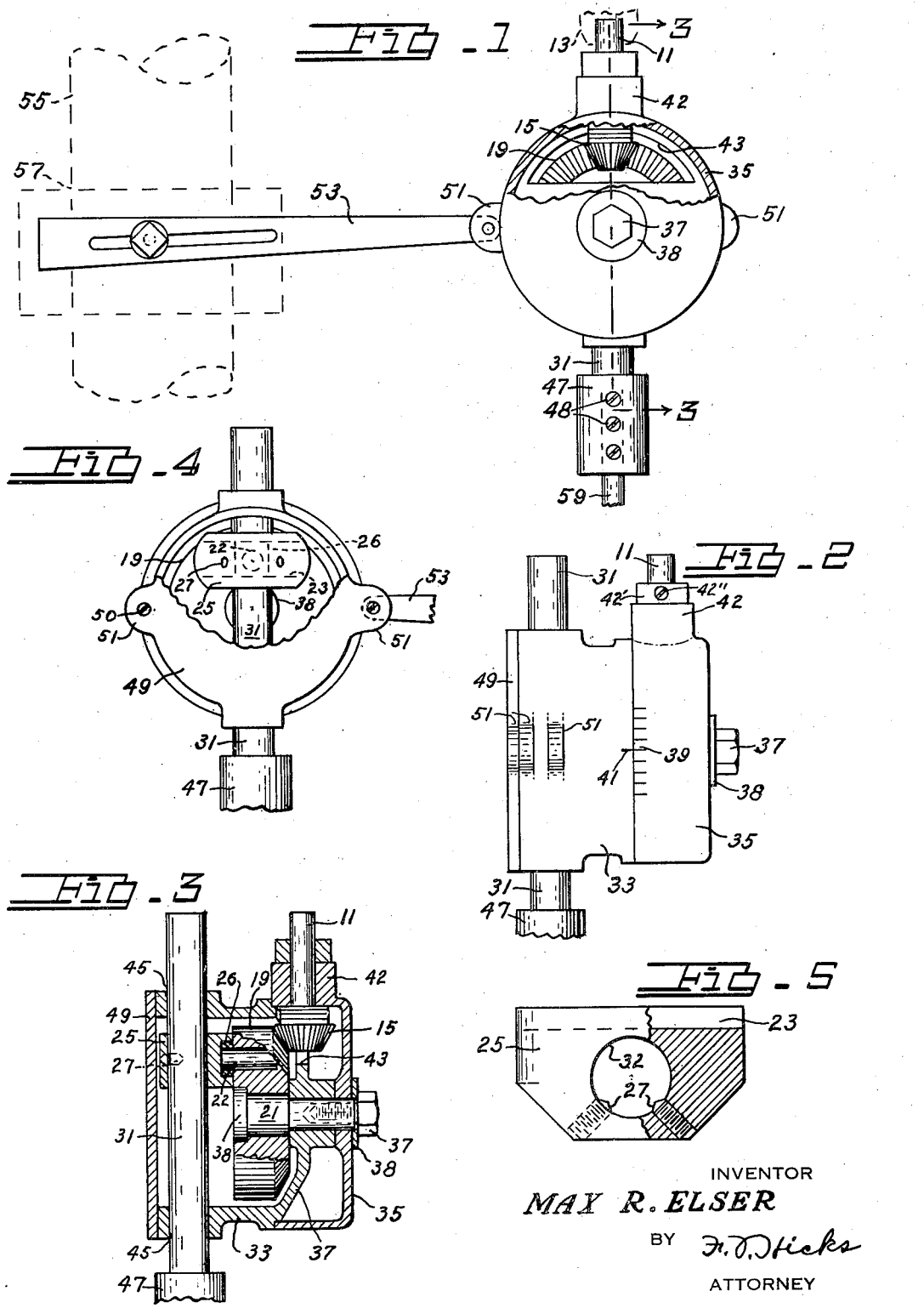
INVENTOR
MAX R. ELSER
BY F.T.Hicks
ATTORNEY Patented Oct. 11, 1949

2,484,158

UNITED STATES PATENT OFFICE 2,484,158

RECIPROCATING TOOL ATTACHMENT

Max R. Elser, Dearborn, Mich.

Application February 21, 1947, Serial No. 730,157

1 Claim. (Cl. 74—50)

My invention pertains to a reciprocating tool attachment to be applied to convert various shop machines for performing reciprocating tool operations.

It is an object of my invention to provide an attachment which can be conveniently applied to drill presses, lathes or other shop machines for holding and operating various reciprocating tools to do various operations such as filing, slotting, sawing, peening, punching, marking, riveting and other operations on metals, plastics or other materials.

It is also an object of my invention to provide a reciprocating tool attachment which may be conveniently adjusted angularly to operate the reciprocating tools to work on a work piece at any desired angle.

A further object of my invention is to provide a reciprocating tool attachment which is of a simple rugged construction, light in weight and reliable in operation.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a front elevational view showing my reciprocating tool attachment and partially broken away for showing the internal structure;

Fig. 2 is a side elevational view thereof;

Fig. 3 is a sectional view on line 3—3 on Fig. 1;

Fig. 4 is a rear elevational view showing the back half of the housing, with the cover partially broken away to show the internal arrangement of the device; and Fig. 5 is an enlarged plan view showing the slotted block partially broken away.

Referring more specifically to the figures of the drawing, it will be seen that my reciprocating tool attachment comprises a shaft 11 projecting suitably to be gripped and held in any chuck 13 (shown dotted), which may be the chuck on the lower end of a drill press spindle (not shown), or which may be a chuck or tapered arbor supported and rotated by a lathe or other suitable shop machine. A small bevel gear 15 is integral on the inner end of the shaft 11, or it may be a separate gear secured thereon as by a pin or other suitable means. The small bevel gear 15 drives a larger bevel gear 19 which is supported and rotates freely upon a pin 21. A crank pin 22 is secured in and extends rearwardly from the larger bevel gear where it projects into a slot 23 in a block 25 secured firmly, as by screws 27, on a sliding shaft 31 which extends through an aperture 32 in the block. A sliding block 26 is preferably provided in the slot 23 for receiving the end of the crank pin for minimizing wear and vibration.

As Fig. 3 more clearly shows, the operative parts are enclosed and held or guided in cooperative relations by a manually portable housing or support means having a rear part 33 and a front part 35 both being substantially bowl or cup shaped. The pin 21, whereon the large gear rotates, extends axially forwardly through a central aperture in the front or bottom wall 37 of the rear housing 33 and also through a central aperture in the bottom wall of the front half 35 of the housing. A screw 37 is threaded, through a washer 38, into the projecting end of the pin 21 and serves to firmly secure the two parts of the housing together, with the front part 35 cupped over the front (or bottom) wall 37 of the rear part 33, while providing for conveniently adjusting the angular relation of the two parts of the housing by loosening the screw, turning the rear housing part 33 to the desired angular relation and tightening the screw. The end portion of the pin 21 is turned down to a smaller diameter leaving a rear portion of larger diameter whereupon the large bevel gear rotates, and of suitable length so that the shoulder on the front end of this larger portion takes the thrust for drawing the two parts of the housing 33 and 35 together without the circular head 38 of the pin pinching the larger gear.

For conveniently showing the angular position, a scale 39 and an index mark 41 are adjacently calibrated on the two housing parts along the dividing line between the two parts of the housing. The side wall of the front housing 35 is at one side provided with a suitable bearing boss 42, which is apertured and provided with a suitable bearing surface in accordance with the usual machine design practice, for passing the shaft 11 which drives the small bevel gear. Outside of the boss 42 a collar 42' is preferably secured on the shaft 11, as by a screw 42".

The front wall of the rear housing 33 is provided with a cut-out aperture 43 through which the small bevel gear projects to intermesh with the larger bevel gear. The aperture 43 is of an arcuate form extending sufficiently to permit relative angular adjustment between the two housing parts as desired. For light weight, the front and rear parts of the housing, or support structure, may preferably be cast of aluminum, magnesium or light alloys.

The sliding shaft 31 slides through bearing apertures 45 in opposite sides of the rear housing 33, and these may be lined with bushings or provided with good bearing surfaces in accordance with usual machine shop practices. The lower end of the sliding shaft 31 is provided with a tool receiving chuck 47 wherein screws 48 may be threaded for gripping and holding the desired reciprocating tools, such as tools for performing operations of filing, sawing, peening, punching, riveting, marking, slotting, or other operations.

The back of the rear housing 33 is closed by means of a plate 49 held thereon by screws 50 passing into cooperative lugs 51, one of which is split for receiving one end of an arm 53 to also be secured by the screw. The other end of this arm 53 extends to the drill press column 55 or other suitable stationary structure, where it may be secured as by a clamp 57 or in any suitable manner for holding the attachment from rotating with its shaft 11. The two parts of the housing fitting snugly together and being closed at the rear by the back plate 49, the entire device may be lubricated by filling the housing with a suitable grease or heavy oil.

The reciprocating tool attachment may be quickly and conveniently applied to convert a drill press, lathe or other shop machine for operating reciprocating tools merely by inserting and gripping the projected end of the shaft 11 in a chuck 13, or tapered arbor, supported and rotated by such shop machine. The arm 53 is then extended and engaged with any stationary adjacent structure to prevent the attachment rotating with its shaft 11. The file, saw, peening hammer, marking tool, riveter, punch or other reciprocating tool 59 to be operated is then mounted in and gripped by the chuck 47 on the lower end of the sliding shaft 31, and the corresponding reciprocating tool operations may then be performed. When installed upon a drill press, the table thereof also serves to support the work piece.

It is apparent that within the scope of my invention modifications and different arrangements may be made other than herein disclosed, and the present disclosure is illustrative merely, the invention comprehending variations thereof.

What is claimed as the invention is:

In a reciprocating tool attachment for rotary shop machines, in combination, front and rear housing parts of substantially bowl shape, the housing parts being cupped together and fitted at their edge portions to abut each other in a lubricant tight joint, a central boss portion extending forward from the front wall of the rear housing to abutting contact with the front housing wall, and means within the housing parts to convert rotary driving motion to reciprocatory driven motion comprising a driven wheel fitting centrally against the front wall of the rear housing, said wheel, walls and boss containing a central perforation, a shaft pin extending through the centrally perforated walls and boss, the shaft pin being headed and threaded to receive a nut outside the front housing for controlling the tightness between the housing parts and the boss, a reciprocating shaft slidably guided in the rear housing part and projecting therefrom, a rotary shaft rotatively disposed in the front housing part and projecting therefrom suitably to be mounted and driven by a shop machine for operating said reciprocating shaft through said means, and a tool receiving and holding chuck on a projecting end of said reciprocating shaft.

MAX R. ELSER.

REFERENCES CITED

The following references are of record in the file of this patent:

UNITED STATES PATENTS

| Number | Name | Date |
|---|---|---|
| 1,675,377 | Pocent | July 3, 1928 |
| 2,282,728 | Kern | May 12, 1942 |
| 2,372,731 | Nalbach et al. | Apr. 3, 1945 |
| 2,393,193 | Sacchini | Jan. 15, 1946 |